(12) United States Patent
Morita

(10) Patent No.: US 11,837,409 B2
(45) Date of Patent: Dec. 5, 2023

(54) CERAMIC ELECTRONIC DEVICE AND MANUFACTURING METHOD OF CERAMIC ELECTRONIC DEVICE

(71) Applicant: TAIYO YUDEN CO., LTD., Tokyo (JP)

(72) Inventor: Koichiro Morita, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 0 days.

(21) Appl. No.: 17/590,059

(22) Filed: Feb. 1, 2022

(65) Prior Publication Data
US 2022/0310323 A1    Sep. 29, 2022

(30) Foreign Application Priority Data
Mar. 26, 2021   (JP) .................... 2021-054207

(51) Int. Cl.
| H01G 4/12 | (2006.01) |
| H01G 4/30 | (2006.01) |
| H01G 4/012 | (2006.01) |
| C04B 35/468 | (2006.01) |
| C04B 35/64 | (2006.01) |
| H01G 4/008 | (2006.01) |
| C04B 35/06 | (2006.01) |

(52) U.S. Cl.
CPC ........... H01G 4/1227 (2013.01); C04B 35/06 (2013.01); C04B 35/4682 (2013.01); H01G 4/008 (2013.01); H01G 4/012 (2013.01); H01G 4/30 (2013.01); *C04B 2235/658* (2013.01)

(58) Field of Classification Search
CPC ................ C04B 35/4682; C04B 35/64; C04B 2235/638; H01G 4/008; H01G 4/0085; H01G 4/012; H01G 4/1227; H01G 4/30
See application file for complete search history.

(56) References Cited

U.S. PATENT DOCUMENTS

| 5,264,399 A | * | 11/1993 | Casey ................... C03C 14/002 501/7 |
| 6,137,672 A | * | 10/2000 | Mizuno .................... H01G 4/12 501/153 |
| 2008/0101841 A1 | | 5/2008 | Mushimoto ................... 400/569 |
| 2013/0009515 A1 | * | 1/2013 | Kim ........................ H01G 4/12 336/200 |
| 2018/0182549 A1 | | 6/2018 | Koide et al. |
| 2019/0135683 A1 | * | 5/2019 | Gleason .................. C04B 35/14 |
| 2019/0333698 A1 | | 10/2019 | Sugita |

FOREIGN PATENT DOCUMENTS

| JP | 2007-145649 A | 6/2007 |
| JP | 2008-105240 A | 5/2008 |
| JP | 2010-47181 A | 3/2010 |
| JP | 2018-107413 A | 7/2018 |
| JP | 2019-192862 A | 10/2019 |

* cited by examiner

*Primary Examiner* — Nathan Milakovich
(74) *Attorney, Agent, or Firm* — Stein IP, LLC

(57) ABSTRACT

A ceramic electronic device includes a plurality of dielectric layers of which a main component is a ceramic having a perovskite structure, and a plurality of internal electrode layers, each of which is stacked through each of the plurality of dielectric layers and includes a co-material which is inactive against the main component of the plurality of dielectric layers.

15 Claims, 9 Drawing Sheets

CERAMIC ELECTRONIC DEVICE AND MANUFACTURING METHOD OF CERAMIC ELECTRONIC DEVICE

CROSS-REFERENCE TO RELATED APPLICATION

This application is based upon and claims the benefit of priority of the prior Japanese Patent Application No. 2021-054207, filed on Mar. 26, 2021, the entire contents of which are incorporated herein by reference.

FIELD

A certain aspect of the present invention relates to a ceramic electronic device and a manufacturing method of a ceramic electronic device.

BACKGROUND

Ceramic electronic devices such as multilayer ceramic capacitors are being used in order to remove noise in a high frequency communication system of which a representative is a mobile phone (for example, see Japanese Patent Application No. 2007-145649, Japanese Patent Application Publication No. 2008-105240, Japanese Patent Application Publication No. 2010-047181, Japanese Patent Application Publication No. 2018-107413, and Japanese Patent Application Publication No. 2019-192862). Multilayer ceramic capacitors having a small size (thin size) and a large capacity are requested in the mobile devices. Electric power saving progress in electric devices is also requested.

SUMMARY OF THE INVENTION

According to an aspect of the present invention, there is provided a ceramic electronic device including: a plurality of dielectric layers of which a main component is a ceramic having a perovskite structure; and a plurality of internal electrode layers, each of which is stacked through each of the plurality of dielectric layers and includes a co-material which is inactive against the main component of the plurality of dielectric layers.

A manufacturing method of a ceramic electronic device includes: forming a multilayer structure by stacking a plurality of stack units, each of which has a structure in which a pattern of metal conductive paste including a co-material is printed on a dielectric green sheet of a dielectric material including ceramic material powder having a perovskite structure; and firing the multilayer structure, wherein the co-material does not react with the ceramic material powder at a temperature of the firing of the multilayer structure.

DETAILED DESCRIPTION

When AC (alternately current) input level is reduced, an electric capacity is also reduced. Therefore, there is a problem that performance is degraded in a low voltage circuit.

A description will be given of an embodiment with reference to the accompanying drawings.

Embodiment

Figure 1:
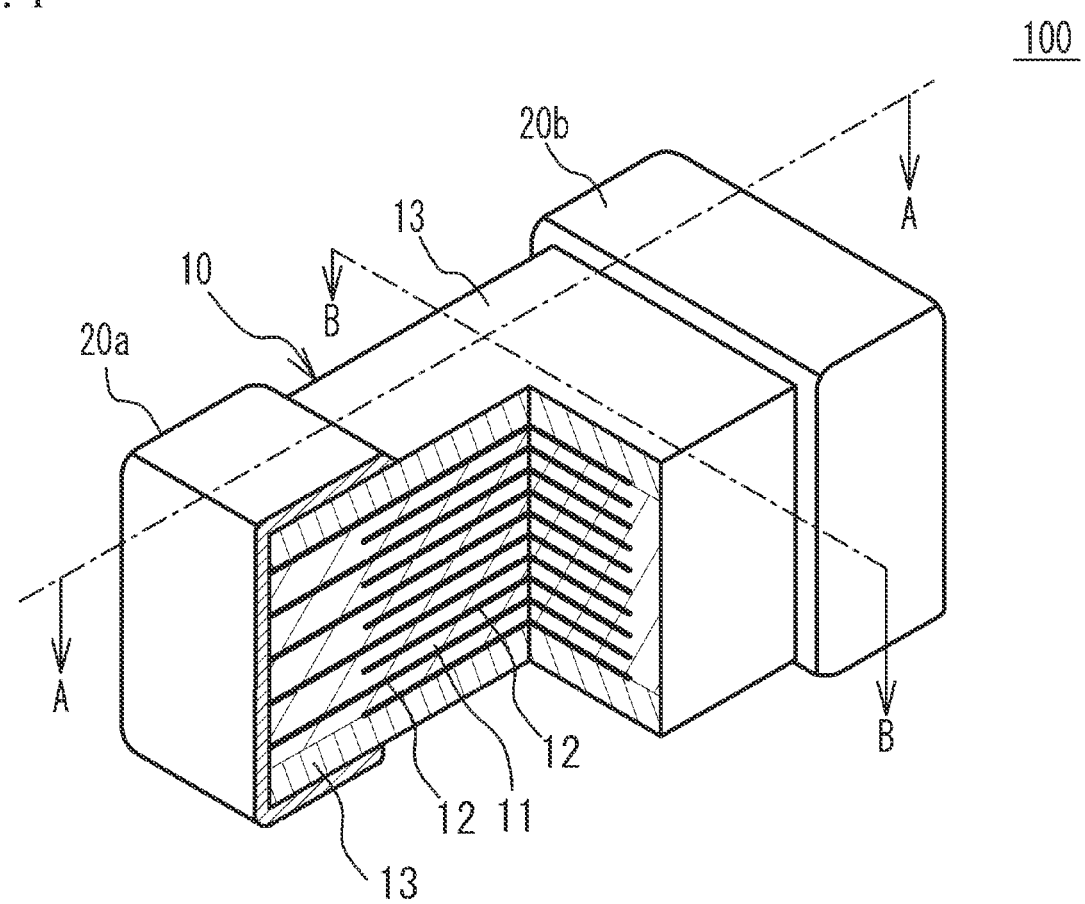
FIG. 1 illustrates a perspective view of a multilayer ceramic capacitor in which a cross section of a part of the multilayer ceramic capacitor is illustrated.
Figure 2:
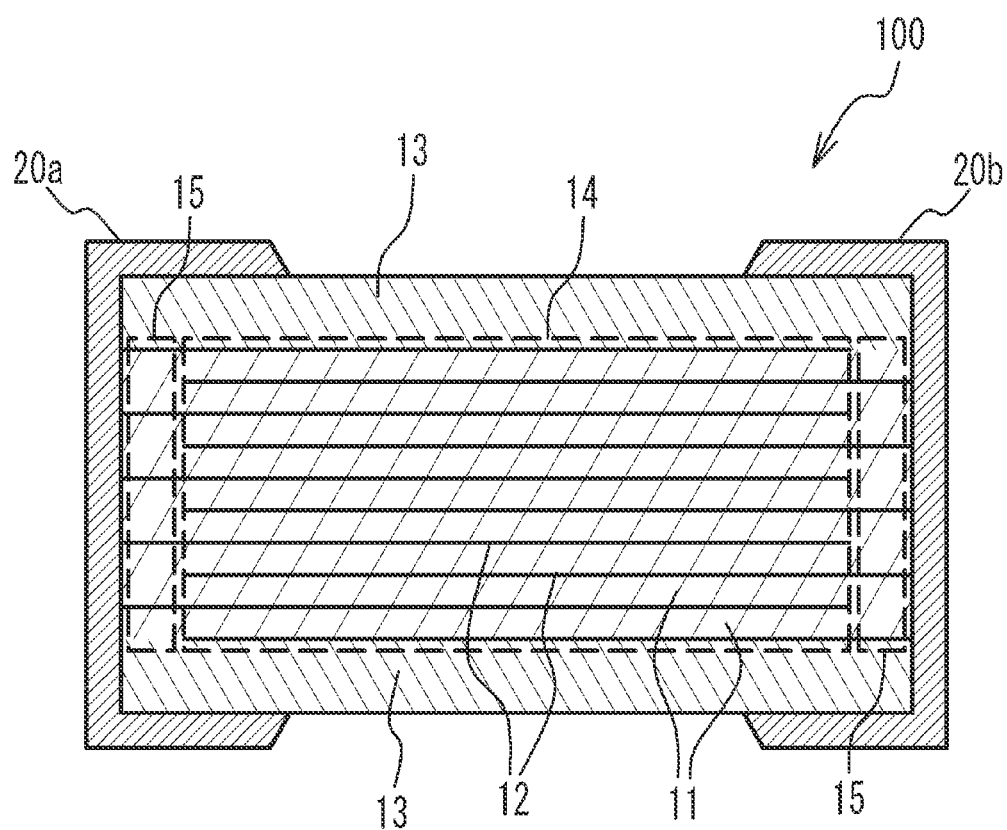
FIG. 2 illustrates a cross section taken along a line A-A of FIG. 1.
Figure 3:
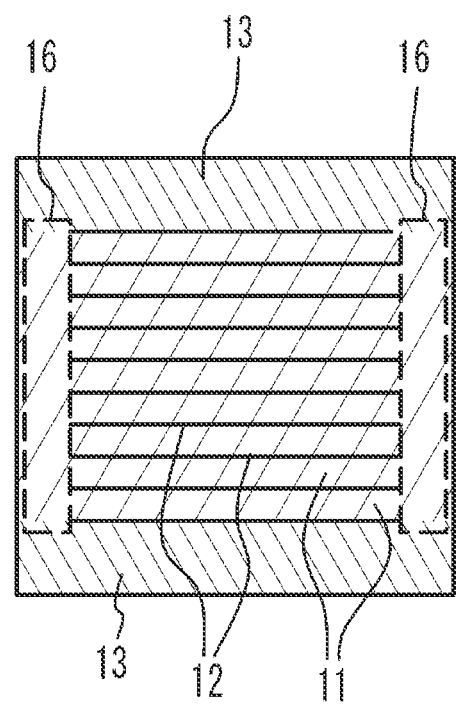
FIG. 3 illustrates a cross section taken along a line B-B of FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich an internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof.

A main component of the dielectric layers 11 is a ceramic material that is expressed by a general formula $ABO_3$ and has a perovskite structure. The perovskite structure includes $ABO_{3-\alpha}$ having an off-stoichiometric composition. An A site of the ceramic material includes at least Ba. The ceramic material may be $BaTiO_3$ (barium titanate), $Ba_{1-x-y}Ca_xSr_yTi_{1-z}Zr_zO_3$ (0≤x≤1, 0≤y≤1, 0≤z≤1) having a perovskite structure or the like.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers 12 next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

When an input level of AC is reduced in the multilayer ceramic capacitor 100, an electrical capacity may be also reduced. In this case, the performance may be degraded in a low voltage circuit. In particular, it is requested to secure the electrical capacity at an ultra low AC voltage of 50 mVrms or less.

From a viewpoint of securing a high capacity at a low AC voltage, it is favorable that the multilayer ceramic capacitor 100 has favorable AC voltage characteristic. That is, it is favorable that the reduction rate of the capacity with respect to the reduction of the AC voltage is small. Recently, it is favorable that the capacity at the low AC voltage is high. For example, it is favorable to secure the capacity of 50 mVrms or less.

An effort for improving the AC voltage characteristic has been made. For example, it is thought that Gd (gadolinium) is added to the dielectric layers 11. However, Gd may degrade the insulation characteristic, and may cause degradation of the reliability. Therefore, when the AC voltage characteristic is improved, the reliability may be degraded. In this manner, in the method of only adjusting the composition of the dielectric layers 11, high capacity may not be necessarily achieved at a sufficiently low AC voltage or other characteristic such as insulation characteristic or the reliability may be degraded.

The present inventors have found that the cause which limits the effect of adjusting the composition of the dielectric layers 11 is the metal conductive paste for forming the internal electrode layers 12. There may be a lot of cases where a material called a co-material which acts as a steric hindrance among metal powder during the sintering of the metal powder and improves the continuity modulus by delaying the sintering is included in the metal conductive paste for forming the internal electrode layers 12. The present inventors have found that a part of the co-material is extruded during the sintering and reacts with the dielectric material, and the dielectric constant in the ultra low AC environment at 50 mVrms or less is reduced.

The co-material is often a micro particle such as $BaTiO_3$ or $CaZrO_3$ or a micro powder material having the same composition as the dielectric layer 11. The co-material is designed so as to act as a steric hindrance among metal powder of the metal conductive paste and delay the sintering of the metal particles. Normally, micro powder has a particle diameter which is much smaller than that of the material of the dielectric layer 11. Therefore, even if the co-material has the same composition as that of the main component of the dielectric layer 11, the reactivity of the co-material is extremely high. Therefore, the micro particle extruded toward the dielectric layer 11 reacts with the grains of the dielectric layer 11. The reaction causes the grain growth of the dielectric grains next to the internal electrode layer 12 and degrades the characteristic such as the AC voltage characteristic. In particular, when the conventional co-material includes an additive (rare earth element, Mg (magnesium), Mn (manganese), V (vanadium), or the like) which can be solid-solved in the perovskite compound, the grown grains become exotic component grains of which a concentration of the additive is high. A ferroelectric domain wall hardly moves because of pinning caused by the solid-solved element. This may degrade the AC voltage characteristic.

The present inventors have found that the AC voltage characteristic can be improved without loss of the function of the co-material (keeping high electrode continuity modulus by delaying the sintering of the internal electrode layer 12) by using, as the co-material, a micro particle material which does not react with the main component ceramic of the dielectric layer 11 at the firing temperature and acts as a steric hindrance among metal powder during the firing of the metal conductive paste for forming the internal electrode layer 12. In particular, the present inventors have found that the reduction of the capacity at the ultra low AC voltage at 50 mVrms or less can be effectively suppressed.

For example, amorphous silica is used as the co-material particle which does not react with the main component ceramic of the dielectric layers 11 at the firing temperature and acts as a steric hindrance among metal powder during the firing of the metal conductive paste for forming the internal electrode layers 12. The micro particles of the amorphous silica or the like are not solid-solved into the perovskite compound acting as the main material of the dielectric layers 11, at a normal pressure. For example, the co-material does not include other elements other than Si and O (elements for structure the silica). In this point, the embodiment is basically different from the idea where a similar material for corresponding to the dielectric material (perovskite compound or material having the same composition as the dielectric layer 11) is used.

A part of the co-material used in the embodiment is included in the internal electrode layers 12 and another part of the co-material is extruded from the internal electrode layers 12, when the sintering of the internal electrode layers 12 progresses to some extent. In this case, the extruded co-material fulfills cavities of the dielectric layers 11 even if the co-material is a micro particle. However, the co-material is not solid-solved in the perovskite compound of the dielectric layers 11. Therefore, the co-material does not cause the local grain growth of the dielectric grains and improves the AC voltage characteristic. Moreover, a special dielectric material composition which sacrifices various characteristic may not be necessarily used. Therefore, it is possible to improve only the AC voltage characteristic while conventional material having excellent characteristics is used.

Figure 4:
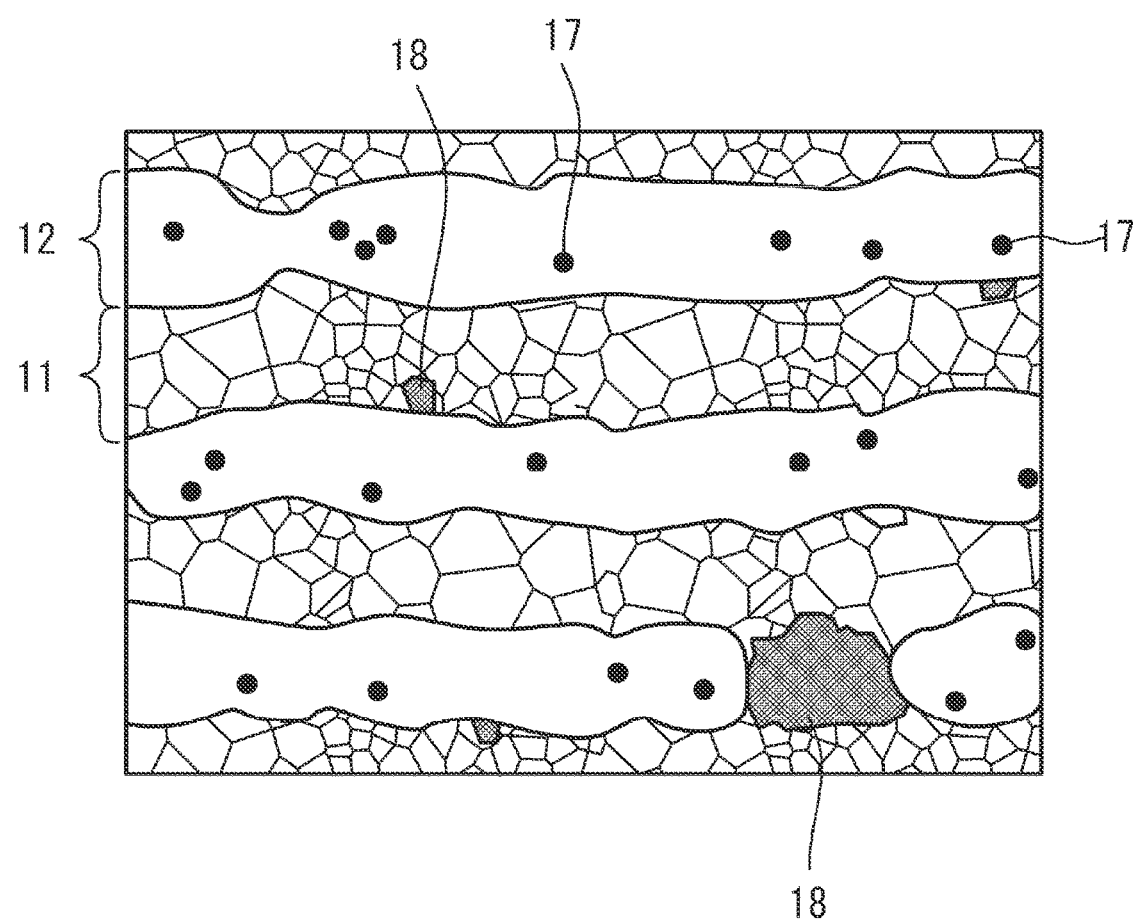
FIG. 4 illustrates co-material grains in an internal electrode layer.

As illustrated in FIG. 4, the internal electrode layers 12 include co-material grains 17 inside thereof. The co-material grains 17 are inactive against the main component ceramic of the dielectric layers 11. That is, the co-material grains 17 do not react with the main component ceramic and are not solid-solved in the main component ceramic. Generally, the co-material grains do not form a solid solution with the main component ceramic. The co-material grains 17 are enclosed in the internal electrode layers 12 and does not contact the dielectric layers 11. There may be a case where the co-material grains 17 are located in the internal electrode layer 12, and a part of the co-material grains 17 contacts the dielectric layer 11. There may be a case where the co-material grains 17 may be located on a crystal grain boundary between crystal grains of the main component metal of the internal electrode layer 12. There may be a case where two or more crystal grains of the main component metal are aligned in a direction in which the internal electrode layer 12 extends, and the crystal grains of the main component metal contact both two adjacent dielectric layers 11, when the thickness of the internal electrode layer 12 is reduced. In the structure, there may be a case where the co-material grain 17 is located on the crystal grain boundary between the crystal grains of the main component metal. As illustrated in FIG. 4, the co-material grain 17 is different from an interposed substance 18 located in the dielectric layer 11. The co-material grain 17 is also different from the interposed substance 18 located on a discontinuity of the internal electrode layer 12.

When the amount of the co-material grain 17 is small in the internal electrode layer 12, a sufficient function as the co-material may not be necessarily achieved. Accordingly, it is preferable that the amount of the co-material grain 17 has a lower limit. For example, it is preferable that the amount of the co-material grain 17 in the internal electrode layer 12 is 0.2 mass % or more. It is more preferable that the amount of the co-material grain 17 in the internal electrode layer 12 is 2.0 mass % or more. It is still more preferable that the amount of the co-material grain 17 in the internal electrode layer 12 is 5.0 mass % or more.

When the amount of the co-material grain 17 is large in the internal electrode layer 12, a continuity modulus of the internal electrode layer 12 after sintering may be reduced. Accordingly, it is preferable that the amount of the co-material grain 17 has an upper limit. For example, it is preferable that the amount of the co-material grain 17 in the internal electrode layer 12 is 10.0 mass % or less. It is more preferable that the amount of the co-material grain 17 in the internal electrode layer 12 is 7.0 mass % or less. It is still more preferable that the amount of the co-material grain 17 in the internal electrode layer 12 is 6.0 mass % or less.

When the co-material grain 17 is large, the co-material grain 17 may be extruded from the internal electrode layer 12 during the firing and the co-material grain 17 may not necessarily achieve a function as a steric hindrance in the internal electrode layer 12. Moreover, when the co-material grain 17 is extruded from the internal electrode layer 12, the continuity modulus of the internal electrode layer 12 may be reduced. Accordingly, it is preferable that an average grain diameter of the co-material grain 17 in the internal electrode layer 12 has an upper limit. For example, it is preferable that the average grain diameter of the co-material grain 17 in the internal electrode layer 12 is 30 nm or less. It is more preferable that the average grain diameter of the co-material grain 17 in the internal electrode layer 12 is 20 nm or less. It is possible to measure the average grain diameter of the co-material grain 17 by observing the diameter of the co-material grain left in the internal electrode layer 12 using an electron microscope.

When the average grain diameter of the co-material grain 17 is small in the internal electrode layer 12, the co-material grains may aggregate together and may not be necessarily dispersed in the electrode grains. Accordingly, it is preferable that the average grain diameter of the co-material grain 17 has a lower limit. For example, it is preferable that the average grain diameter of the co-material grain 17 in the internal electrode layer 12 is 10 nm or more. It is more preferable that the average grain diameter of the co-material grain 17 in the internal electrode layer 12 is 15 nm or more.

When the average crystal grain diameter of the main component metal of the internal electrode layer 12 is small, the sintering of the internal electrode layer 12 starts at a temperature at which the sintering of the ceramic body does not start yet. In this case, a crack may occur in the multilayer ceramic capacitor 100 because of the contraction difference between the internal electrode layer 12 and the ceramic body. Accordingly, it is preferable that the average crystal grain diameter of the main component metal of the internal electrode layer 12 has a lower limit. For example, it is preferable that the average crystal grain diameter of the main component metal of the internal electrode layer 12 is 30 nm or more. It is more preferable that the average crystal grain diameter is 50 nm or more. It is still more preferable that the average crystal grain diameter is 100 nm or more.

When the average crystal grain diameter of the main component metal of the internal electrode layer 12 is large, a surface of a printed film is not smooth. Therefore, after the firing, the internal electrode 12 may be broken. Accordingly, it is preferable that the average crystal grain diameter of the main component metal of the internal electrode layer 12 has an upper limit. For example, it is preferable that the average crystal grain diameter of the main component metal of the internal electrode layer 12 is 250 nm or less. It is more preferable that the average crystal grain diameter is 200 nm or less. It is still more preferable that the average crystal grain diameter is 150 nm or less.

When the dielectric layer 11 is thin, the co-material grain 17 fills a cavity of the dielectric layer 11 and sufficiently suppress the grain growth in the dielectric layer 11. Accordingly, it is preferable that the thickness of the dielectric layer 11 has an upper limit. For example, it is preferable that the thickness of the dielectric layer 11 is 2.0 μm or less. It is more preferable that the thickness of the dielectric layer 11 is 1.0 μm or less. It is still more preferable that the thickness of the dielectric layer 11 is 0.5 μm or less.

The thickness of the internal electrode layer 12 may be 0.3 μm or more and 3.0 μm or less. The thickness of the internal electrode layer 12 may be 0.4 μm or more and 2.0 μm or less. The thickness of the internal electrode layer 12 may be 0.5 μm or more and 1.0 μm or less.

Figure 5:
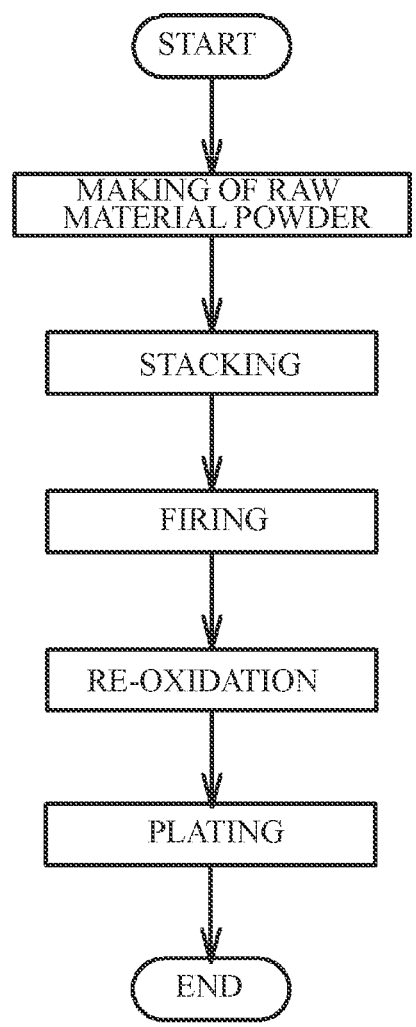
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is a tetragonal compound having a perovskite structure and has a high dielectric constant. Generally, $BaTiO_3$ is obtained by reacting a titanium material such as titanium dioxide with a barium material such as barium carbonate and synthesizing barium titanate. Each material is weighed so that the A/B ratio is 0.980 or less in a perovskite structure after synthesizing. Various methods can be used as a synthesizing method of the ceramic structuring the dielectric layer 11. For example, a solid-phase method, a sol-gel method, a hydrothermal method or the like can be used. The embodiment may use any of these methods.

Additive compound is added to the resulting ceramic powder in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium), or Yb (ytterbium)), or an oxide of Co (cobalt), Ni (nickel), Li (lithium), B (boron), Na (sodium), K (potassium) or Si (silicon), or glass including cobalt, nickel, lithium, boron, sodium, potassium or silicon.

For example, a compound including the additive compound is wet-blended with the resulting ceramic raw material, is dried and crushed into a ceramic material. For example, the grain diameter may be adjusted by crushing the resulting ceramic material as needed. Alternatively, the grain diameter of the resulting ceramic material may be adjusted by combining the crushing and classifying. Thus, the dielectric material is formed.

(Stacking process) Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet is painted on a base material by, for example, a die coater method or a doctor blade method, and then dried.

Next, a metal conductive paste for forming an internal electrode 12 is applied to the surface of the dielectric green sheet by screen printing or gravure printing. The metal conductive paste includes an organic binder. Thus, the internal electrode patterns are arranged so as to be alternately extracted to each of the external electrodes. The thickness of the internal electrode patterns is adjusted in accordance with the thickness of the internal electrode layer 12 after the firing. As the co-material, a micro particle material is added to the metal conductive paste. The micro particle does not react with the main component ceramic of the dielectric material at the firing temperature and acts as a steric hindrance among metal powder during the firing of the metal conductive paste. For example, as the co-material, amorphous silica particles are added. The average diameter of the metal powder in the metal conductive paste may be 30 nm or more and 250 nm or less. The average diameter of the metal powder in the metal conductive paste may be 50 nm or more and 200 nm or less. The average diameter of the metal powder in the metal conductive paste may be 100 nm or more and 150 nm or less.

After that, the dielectric green sheets on which the internal electrode pattern is printed is cut into a predetermined size. Then, the dielectric green sheets are alternately stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to the pair of external electrodes 20a and 20b of different polarizations. For example, a total number of the staked dielectric green sheets is 100 to 1000. Cover sheets for forming the cover layers 13 are crimped on the stacked dielectric green sheets and under the stacked dielectric green sheets. The resulting stacked dielectric green sheets are cut into a predetermined chip size (for example, 1.0 mm×0.5 mm).

(Firing process) The binder is removed from the ceramic multilayer structure in an $N_2$ atmosphere. Metal paste that will become the base layers of the external electrodes 20a and 20b is applied to the ceramic multilayer structure by a dipping method. The resulting ceramic multilayer structure is fired for ten minutes to 2 hours in a reductive atmosphere having an oxygen partial pressure of $10^{-12}$ to $10^{-9}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in $N_2$ gas atmosphere in a temperature range of 600 degrees C. to 1000 degrees C.

(Plating process) After that, by a plating method, metal layers such as Cu, Ni, Sn or the like may be plated on the external electrodes 20a and 20b. With the processes, the multilayer ceramic capacitor 100 is manufactured.

In the manufacturing method of the embodiment, as the co-material, a micro particle material is added to the metal conductive paste. The micro particle does not react with the main component ceramic of the dielectric material at the firing temperature and acts as a steric hindrance among metal powder during the firing of the metal conductive paste. The co-material particle of the embodiment delays the sintering of the metal powder of the metal conductive paste, and suppresses the grain growth of the dielectric layers 11 without reacting with the main component ceramic having the perovskite structure. It is therefore possible to improve the AC voltage characteristic of the multilayer ceramic capacitor 100.

When the amount of the co-material particle is small in the metal conductive paste of the internal electrode pattern, sufficient function as the co-material may not be necessarily achieved. Accordingly, it is preferable that the amount of the co-material particle has a lower limit. For example, it is preferable that the amount of the co-material particle with respect to the metal component in the metal conductive paste of the internal electrode pattern is 0.2 mass % or more. It is more preferable that the amount of the co-material particle with respect to the metal component in the metal conductive paste of the internal electrode pattern is 2.0 mass % or more. It is still more preferable that the amount of the co-material particle with respect to the metal component in the metal conductive paste of the internal electrode pattern is 5.0 mass % or more.

When the amount of the co-material particle is large in the metal conductive paste of the internal electrode pattern, a continuity modulus of the internal electrode layer 12 after sintering may be reduced. Accordingly, it is preferable that the amount of the co-material particle has an upper limit. For example, it is preferable that the amount of the co-material particle with respect to the metal component in the metal conductive paste of the internal electrode pattern is 10.0 mass % or less. It is more preferable that the amount of the co-material particle with respect to the metal component in the metal conductive paste of the internal electrode pattern is 7.0 mass % or less. It is still more preferable that the amount of the co-material particle with respect to the metal component in the metal conductive paste of the internal electrode pattern is 6.0 mass % or less.

When the co-material particle is large, the co-material particle may be extruded from the internal electrode layer 12 during the firing and the co-material particle may not necessarily achieve a function as a steric hindrance in the internal electrode layer 12. Moreover, when the co-material particle is extruded from the internal electrode layer 12, the continuity modulus of the internal electrode layer 12 may be reduced. Accordingly, it is preferable that an average particle diameter of the co-material particle in the metal conductive pate of the internal electrode pattern is 30 nm or less. It is more preferable that the average particle diameter of the co-material particle in the metal conductive paste of the internal electrode pattern is 20 nm or less. It is more preferable that the average particle diameter of the co-material particle in the metal conductive paste of the internal electrode pattern is 15 nm or less.

When the average particle diameter of the co-material particle is small in the metal conductive paste of the internal electrode pattern, the co-material particles may aggregate together and may not be necessarily dispersed in the electrode grains. Accordingly, it is preferable that the average particle diameter of the co-material particle in the metal conductive pate of the internal electrode pattern has a lower limit. For example, it is preferable that the average particle diameter of the co-material particle in the metal conductive paste of the internal electrode pattern is 10 nm or more. It is more preferable that the average particle diameter of the co-material particle in the metal conductive paste of the internal electrode pattern is 15 nm or more. It is more preferable that the average particle diameter of the co-material particle in the metal conductive paste of the internal electrode pattern is 20 nm or more.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Examples

The multilayer ceramic capacitors in accordance with the embodiment were made and the property was measured.

(Example 1) Power, in which $BaTiO_3$ having an average particle diameter was 150 nm was a main material and a small amount of additives of $HO_2O_3$, $MgO$, $MnCO_3$ and $V_2O_5$ was mixed with the main material was dispersed in an organic solvent. Thus a slurry was obtained. A binder was added to the slurry. The resulting slurry was applied on a PET film so as to have a predetermined thickness, and was dried. Thus, a dielectric green sheet was formed. Ni electrode paste was printed on the dielectric green sheet. Amorphous silica of which an amount was 10 weight part with respect to Ni was added to the Ni electrode paste. An average particle diameter of the amorphous silica was 30 nm. 100 of the dielectric sheets on which the Ni electrode paste was printed were stacked. After that, the compact was sandwiched by dielectric greens without the Ni electrode paste, in a stacking direction and was crimped. After that, the resulting compact was cut into a chip of 1005 shape. The compact was subjected to a thermal treatment (removing of the binder) in the $N_2$ atmosphere. As terminal electrodes, Ni paste was applied by dipping on two faces of the chip to which Ni electrode paste were exposed. The resulting compact was fired in mixed gas of $N_2$—$H_2$—$H_2$. After the firing, the fired chip was subjected to a re-oxidation process at 850 degrees C. in the $N_2$ atmosphere. Thus, multilayer ceramic capacitors for measuring the AC characteristic were made. The thickness of the dielectric layers 11 after the firing was 2 rm.

Figure 6:
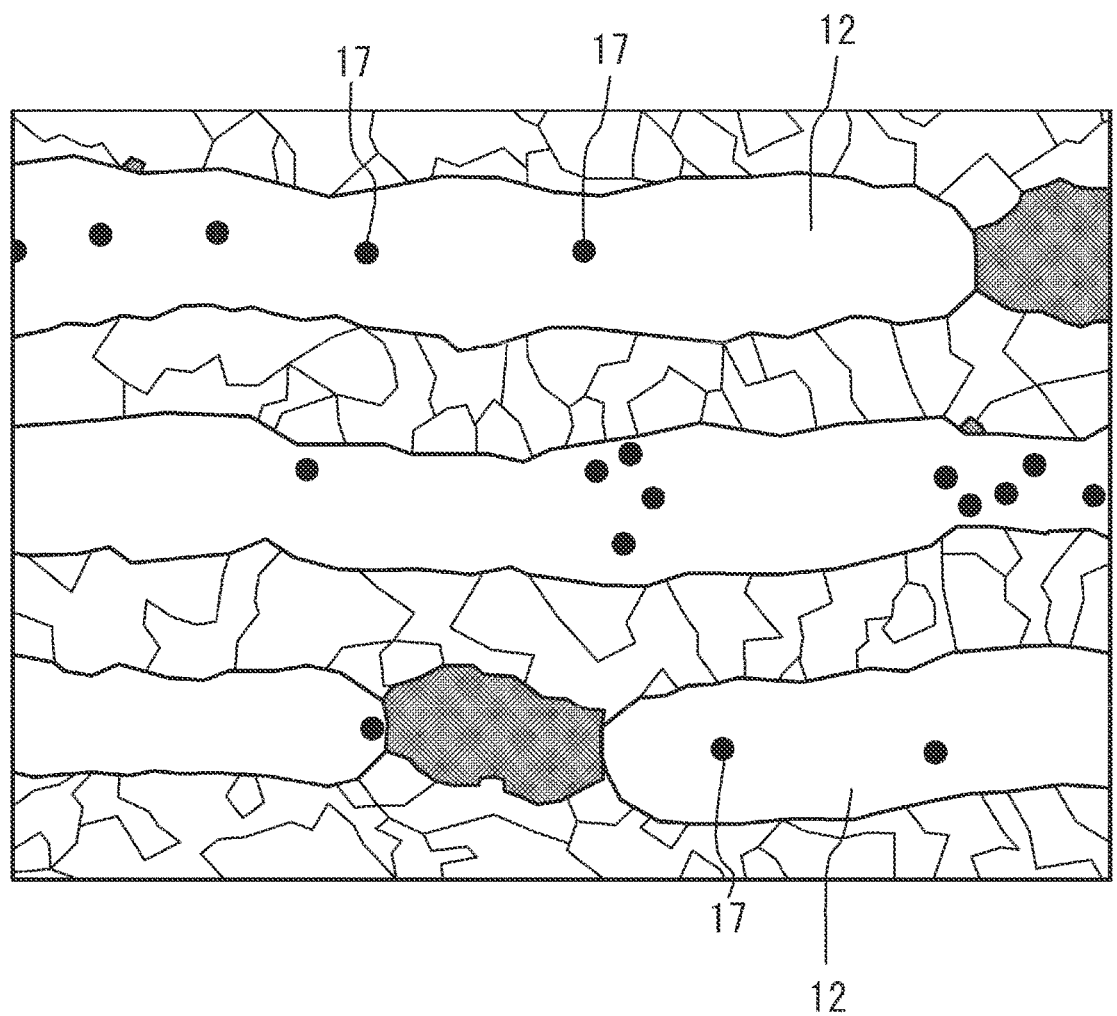
FIG. 6 illustrates a cross section after sintering of an example 1.
Figure 7:
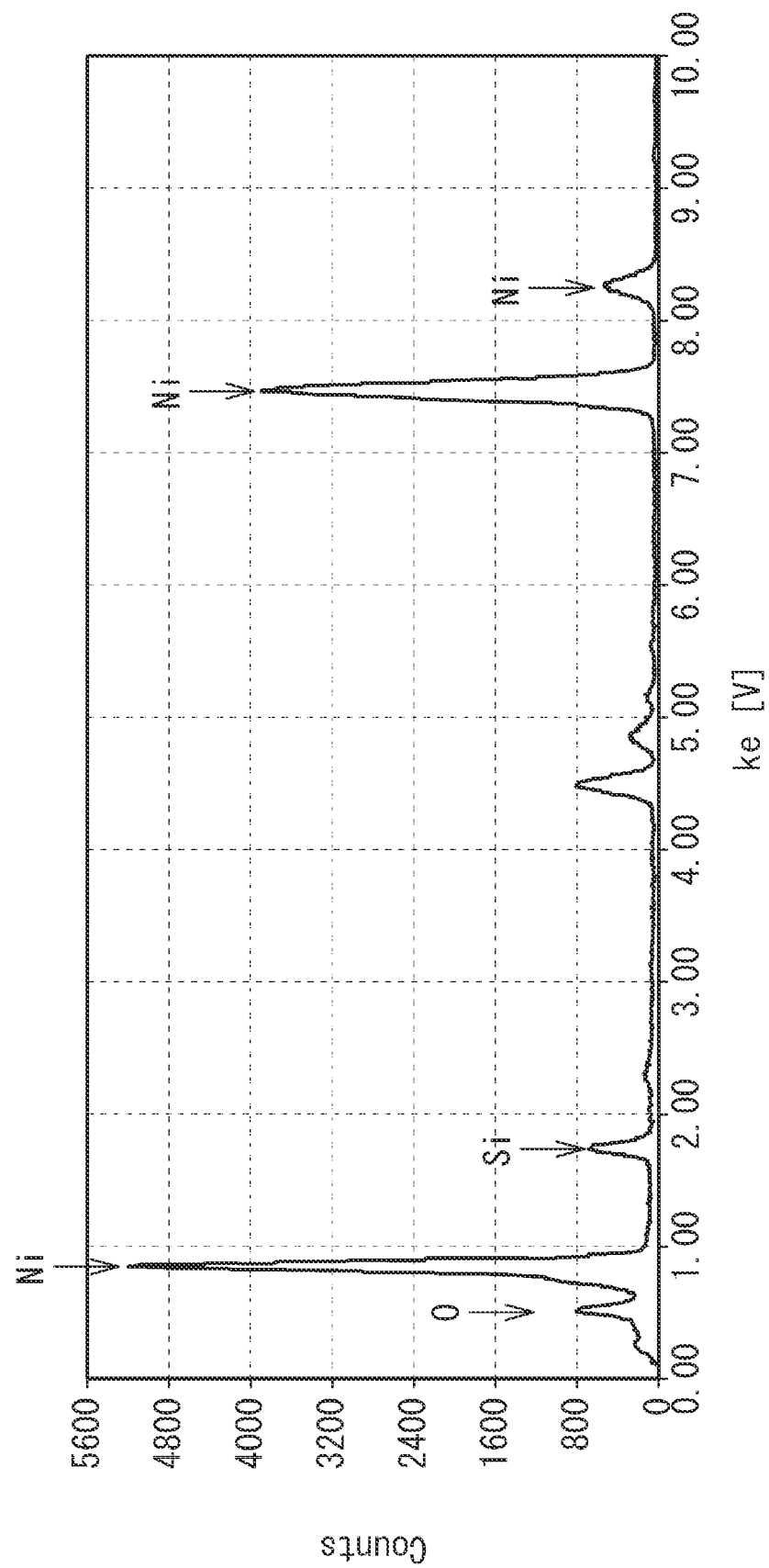
FIG. 7 illustrates results of EDS composition analysis.

FIG. 6 illustrates a cross section after sintering in the example 1. It was observed that the segregated substance of the amorphous silica (the co-material grain 17) was not extruded in the sintering and was left in the Ni electrode (the internal electrode layer 12). It was observed that Si and O were left, from FIG. 7 showing the composition analysis with use of EDS (Energy Dispersive X-ray Spectroscopy).

(Comparative example) In a comparative example, as the co-material, barium titanate having an average particle of 30 nm was added. The amount of the barium titanate was 10 weight part with respect to Ni. Other conditions were the same as those of the example 1.

Figure 8:
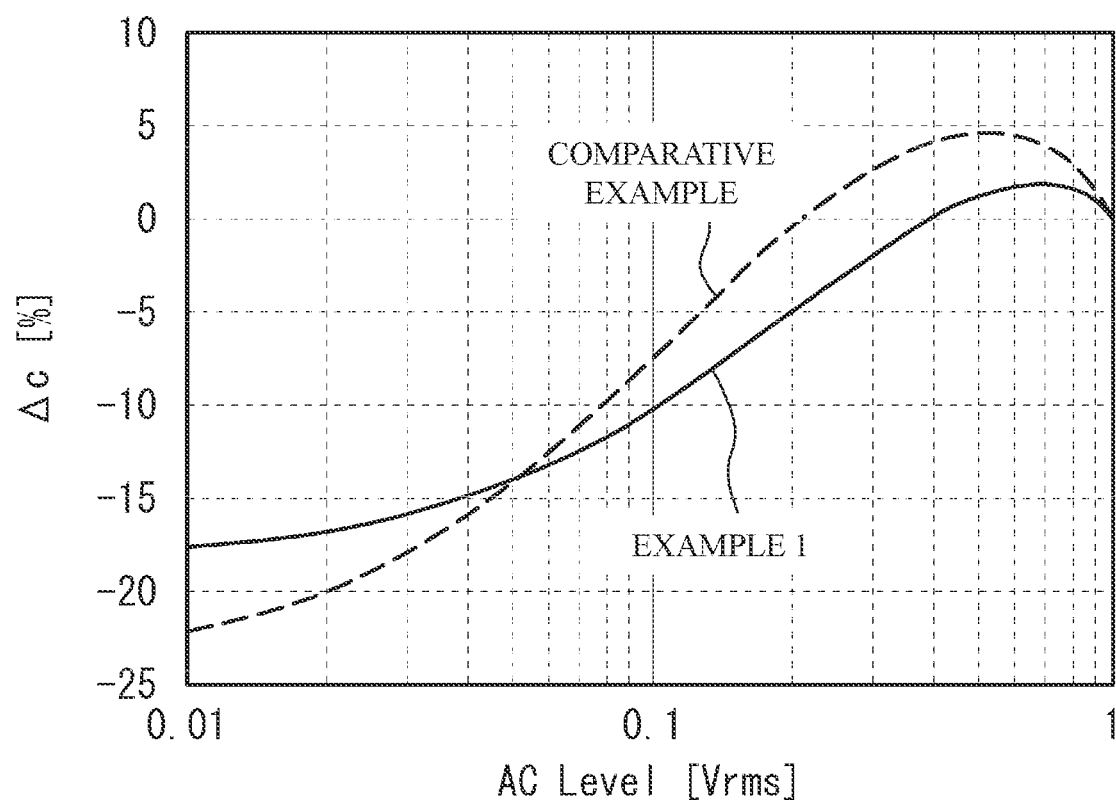
FIG. 8 illustrates measures results of an AC voltage characteristic test.

(Test of AC voltage characteristic) In a test of AC voltage characteristic of each of the example 1 and the comparative example, the AC voltage was changed from 1.0 Vrms to 10 mVrms at 1 kHz and a capacity was measured. And, the capacity changing rate AC of which the standard was a capacity at 1.0 V was evaluated. FIG. 8 shows the results. As show in FIG. 8, the reduction rate of the capacity of the example 1 was smaller than that of the comparative example. Therefore, the AC voltage characteristic of the example 1 was improved more than that of the comparative example. It is thought that this was because the amorphous silica which does not react with the main component ceramic of the dielectric layer 11 at the firing temperature was used as the co-material particle, and the local grain growth in the dielectric layers 11 was suppressed.

(Example 2) In an example 2, the thickness of the dielectric layers 11 was 1.0 μm. Other conditions were the same as those of the example 1.

(Example 3) In an example 3, the thickness of the dielectric layers 11 was 3.0 μm. Other conditions were the same as those of the example 1.

(Example 4) In an example 4, the thickness of the dielectric layers 11 was 4.0 μm. Other conditions were the same as those of the example 1.

(Example 5) In an example 5, the thickness of the dielectric layers 11 was 5.0 μm. Other conditions were the same as those of the example 1.

Figure 9:
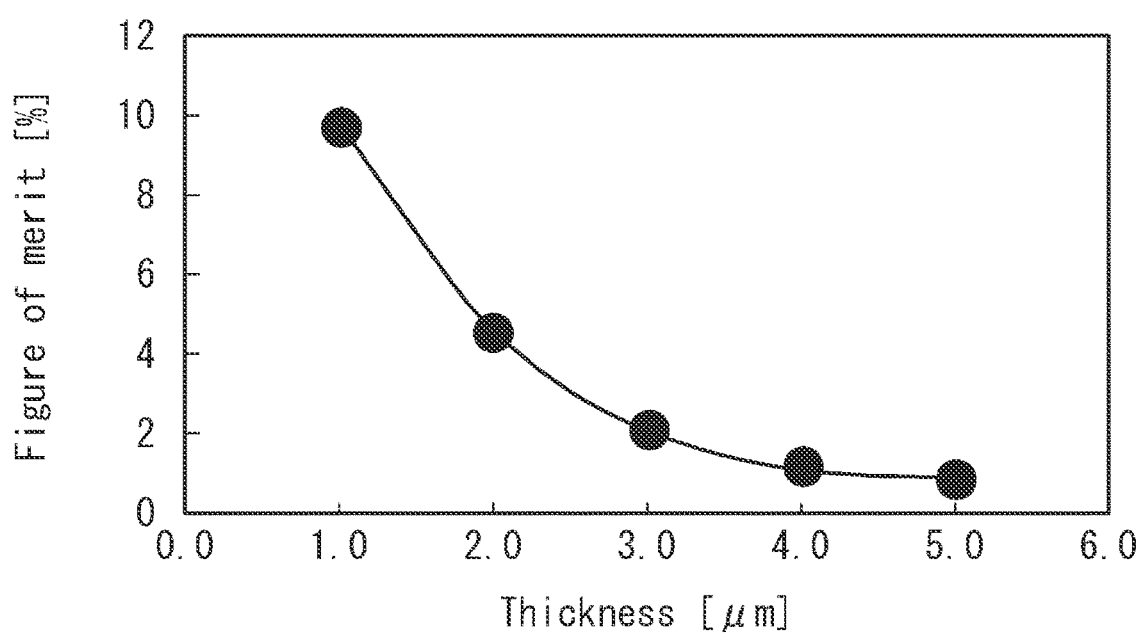
FIG. 9 illustrates a relationship between a thickness of a dielectric layer and an FOM.

It is predicted that the influence caused by the diffusion of the co-material grain increases as the thickness of the dielectric layer 11 decreases, if the same amount of the co-material grain diffuses into the dielectric layers 11. In order to confirm the influence, the dependency on the thickness was plotted in the capacity changing rate of the ultra low voltage at 10 mVrms while the gain of each example with respect to the comparative example was defined as FOM (Figure of Merit). That is, the FOM can be defined as the capacity changing rate ($\Delta C$) of each example—the capacity changing rate ($\Delta C$) of the comparative example at 10 mVrms while the FOM of the comparative example is 1.0. FIG. 9 shows the results. As expected, when the thickness was reduced, the influence got larger. From the results, the effect was achieved regardless of the thickness of the dielectric layers 11. From a viewpoint of enlarging the effect, it is preferable that the thickness of the dielectric layers 11 is 2.0 µm or less.

Although the embodiments of the present invention have been described in detail, it is to be understood that the various change, substitutions, and alterations could be made hereto without departing from the spirit and scope of the invention.

What is claimed is:

1. A ceramic electronic device comprising:
   a plurality of dielectric layers of which a main component is a ceramic having a perovskite structure; and
   a plurality of internal electrode layers, each of which is alternatively stacked with each of the plurality of dielectric layers and includes metal crystal grains, and a co-material which is inactive against the main component of the plurality of dielectric layers, without including a ceramic having a same composition as the ceramic of the main component of the plurality of dielectric layers.

2. The ceramic electronic device as claimed in claim 1, wherein the co-material is an amorphous silica grain.

3. The ceramic electronic device as claimed in claim 1, wherein the co-material is enclosed in each of the plurality of internal electrode layers.

4. The ceramic electronic device as claimed in claim 1, wherein a thickness of each of the dielectric layers is 2.0 µm or less.

5. The ceramic electronic device as claimed in claim 1, wherein an average grain diameter of the co-material is 30 nm or less in each of the plurality of internal electrode layers.

6. The ceramic electronic device as claimed in claim 1, wherein a ratio of the co-material is 0.2 mass % or more and 10.0 mass % or less in each of plurality of internal electrode layers.

7. The ceramic electronic device as claimed in claim 1, wherein a thickness of each of the plurality of internal electrode layers is 0.3 µm or more and 3.0 µm or less.

8. The ceramic electronic device as claimed in claim 1, wherein an average grain diameter of the metal crystal grains is 30 nm or more and 250 nm or less in each of the plurality of internal electrode layers.

9. A manufacturing method of a ceramic electronic device comprising:
   forming a multilayer structure by stacking a plurality of stack units, each of which has a structure in which a pattern of metal conductive paste including a co-material is printed on a dielectric green sheet of a dielectric material including ceramic material powder having a perovskite structure, the pattern of metal conductive paste including metal powder and the co-material without including ceramic material powder having a same composition as the ceramic material powder included in the dielectric material; and
   firing the multilayer structure,
   wherein the co-material does not react with the ceramic material powder at a temperature of the firing of the multilayer structure.

10. The method as claimed in claim 9, wherein the co-material is an amorphous silica grain.

11. The method as claimed in claim 9, wherein a thickness of the dielectric green sheet is adjusted so that a thickness of a dielectric layer made by firing the dielectric green sheet becomes 2.0 µm or less.

12. The method as claimed in claim 9, wherein an average particle diameter of the co-material is 30 nm or less.

13. The method as claimed in claim 9, wherein a ratio of the co-material is 0.2 mass % or more and 10.0 mass % or less in the metal conductive paste.

14. The method as claimed in claim 9, wherein a thickness of the metal conductive paste is adjusted so that a thickness of an internal electrode layer made by firing the metal conductive paste becomes 0.3 µm or more and 3.0 µm or less.

15. The method as claimed in claim 9, wherein an average particle diameter of metal powder of the metal conductive paste is 30 nm or more and 250 nm or less.

* * * * *